Feb. 12, 1946.　　　B. F. BROWN　　　2,394,745
NUTPICKER
Filed June 4, 1942　　　3 Sheets-Sheet 2
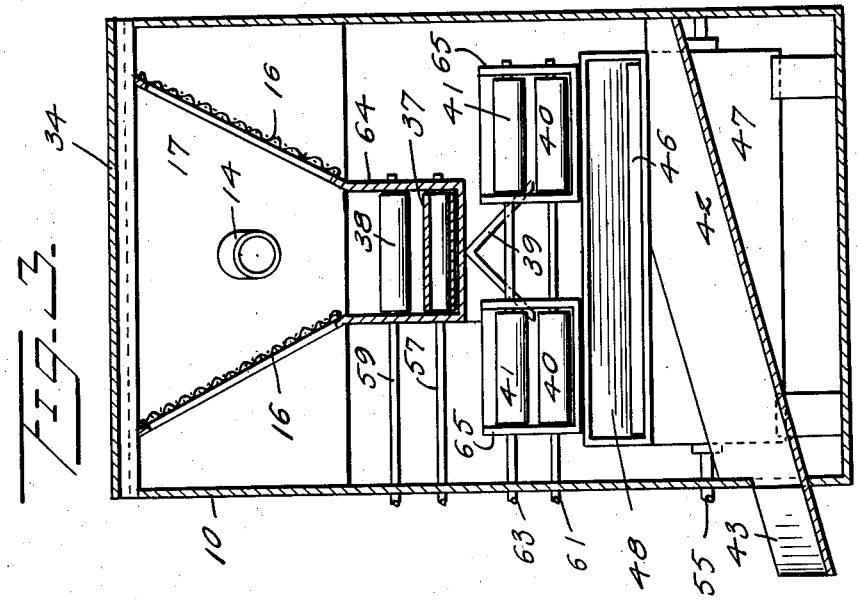
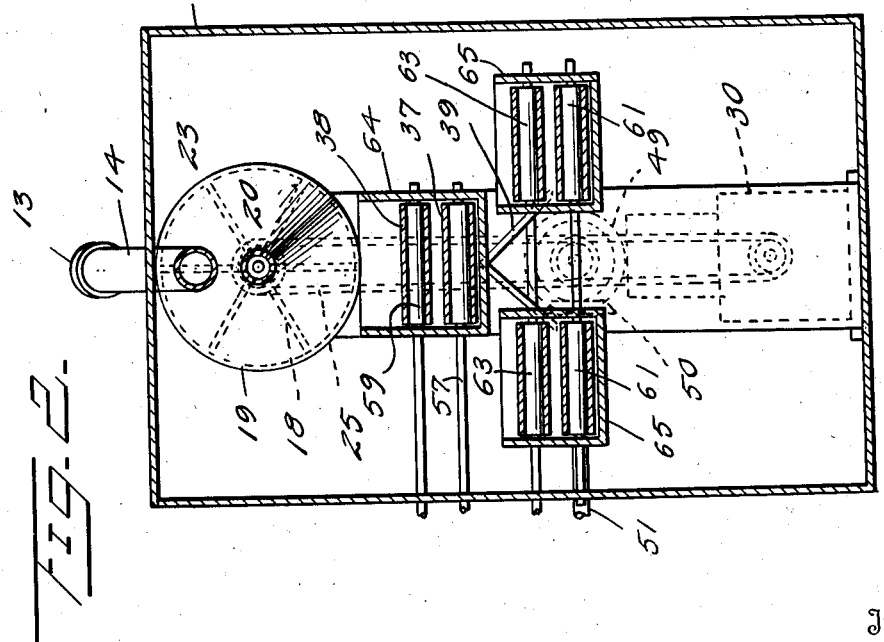
Inventor
B. F. Brown
By L. F. Randolph
Attorney Feb. 12, 1946. B. F. BROWN 2,394,745
NUTPICKER
Filed June 4, 1942 3 Sheets-Sheet 3
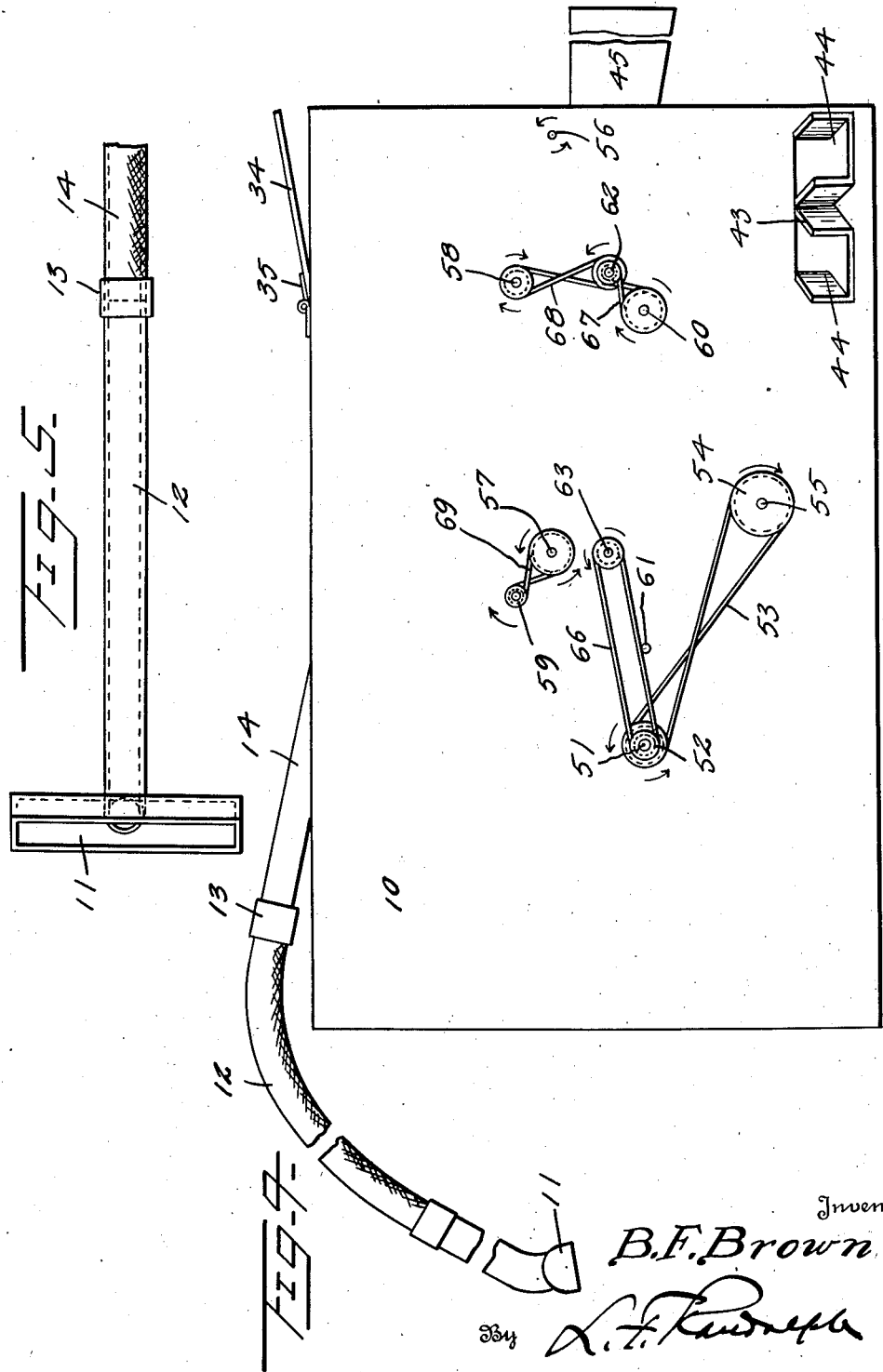

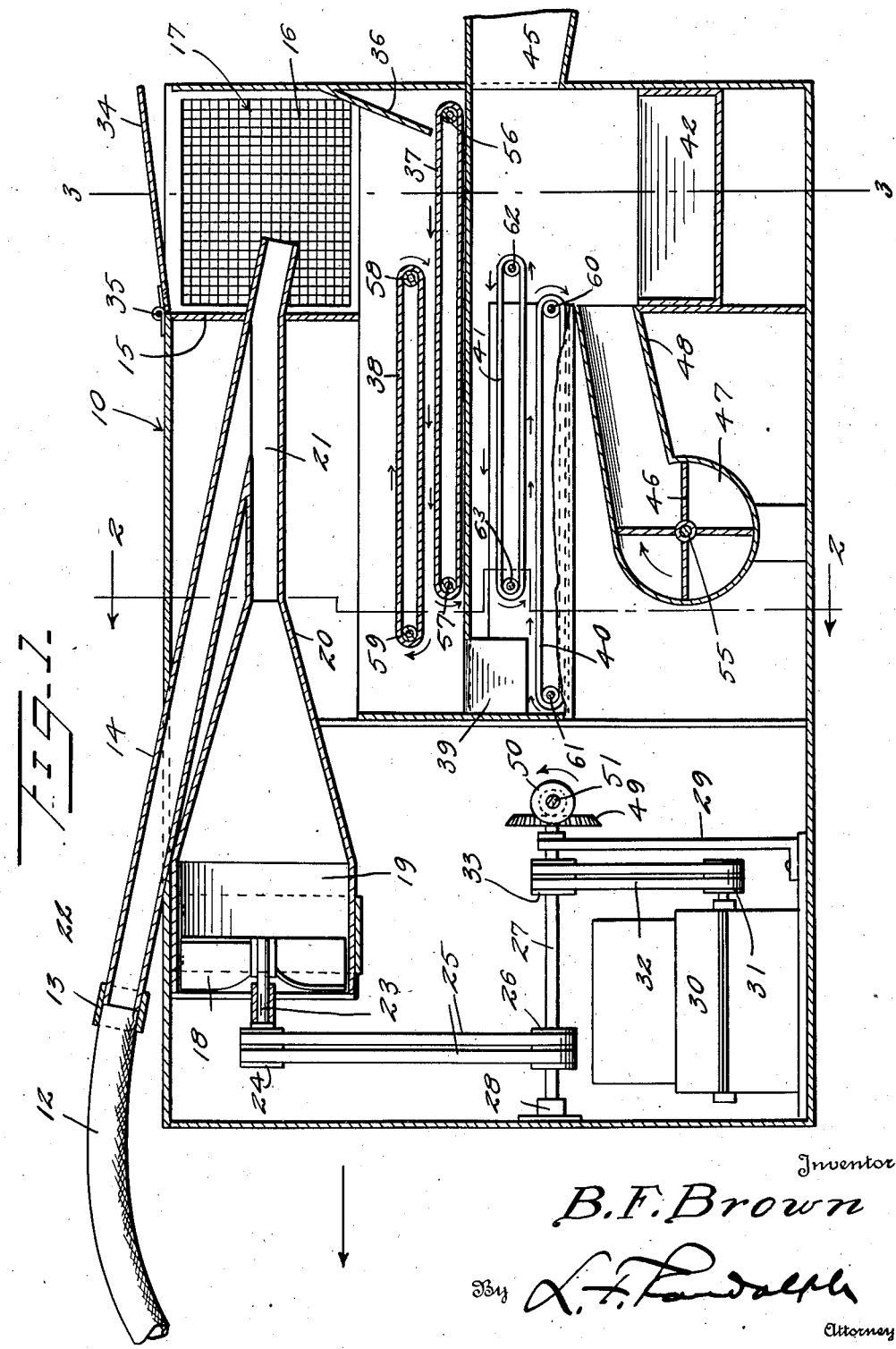

Patented Feb. 12, 1946

2,394,745

UNITED STATES PATENT OFFICE 2,394,745

NUT PICKER

Benjamin F. Brown, Vancouver, Wash.

Application June 4, 1942, Serial No. 445,795

1 Claim. (Cl. 83—35)

This invention relates to an apparatus for harvesting or picking nuts, for instance filberts, from the ground.

A particular object of the invention is to provide a practical construction which will attain the end stated through vacuum action.

Another important object is to provide means to remove husks from the nuts before they are arranged in a pile or sacked, and particularly by passage through belts movable at different speeds.

Still another object is to provide means for blowing the husks from the machine before piling or sacking of the nuts.

The more specific objects and advantages will become apparent from a consideration of the description following taken in connection with accompanying drawings illustrating an operative embodiment.

In said drawings:

Figure 1 is a view primarily in central vertical section through a machine carrying out my invention;

Figure 2 is a vertical sectional view taken on the plane of line 2—2 of Figure 1;

Figure 3 is a vertical sectional view taken on the plane of line 3—3 of Figure 1;

Figure 4 is a side elevation of the machine, and

Figure 5 is an inverted or bottom plan view of the picking nozzle.

Referring specifically to the drawings wherein like reference characters designate like or similar parts, the apparatus comprises a housing or casing of any suitable size or shape which is designated 10. This housing is preferably portable and may be carried by a vehicle or provided with wheels as preferred.

A nozzle of any desired form is provided at 11 for movement over the ground or location from which the nuts are to be picked or removed in order to collect them by vacuum action. Such nozzle is attached to a collecting conduit 12 which is preferably a rubber or other flexible hose and coupled at 13 to a metallic pipe or conduit 14 extending diagonally and into the interior of the casing 10 with its inner end supported in a wall 15, depending from the top of the casing and together with upwardly flaring screens or foraminous walls 16, forming a receiving chute 17 for filberts or other nuts or material which is collected.

Suction or vacuum is created through the nozzle 11 and conduits 12 and 14 to draw the nuts or the like into the chute 17 through the rotation of a fan or blower 18 which may be of any suitable form. Such blower 18 is located within a duct 19 emerging into a tapered portion 20 and then into an outlet pipe or conduit 21 which meets the conduit 14 as shown. Duct 19 is supported in any suitable manner as by means of rivets 22 attached to the casing 10. The shaft of the fan or blower 18 is shown at 23 and is equipped with a pulley 24 traversed by belt means 25 also traversing pulley means 26 on a shaft 27 journaled in suitable bearings 28 and 29 within the casing 10. Said shaft 27 is driven from any suitable prime mover such as an engine 30 whose main shaft has pulley means 31 thereon and drives belt means 32 traversing pulley means 33 on shaft 27.

The casing 10 at the chute 17, is open above and below the same, above the same permitting release of air and being provided with a flap or closure 34 pivoted at 35 to the casing. The vacuum action will maintain the flap 34 open as shown in Figure 1 during operation of the apparatus. A deflector or baffle 36 is provided adjacent the lower end of the chute 17 to direct the collected nuts onto an endless belt conveyor 37. The nuts after reception by conveyor 37 are then moved in the path of the arrows between the conveyor 37 and a conveyor 38 above the same. The nuts and husks after passing between the conveyors 37 and 38 fall onto an inverted V-shaped deflector or divider 39, suitably fastened within casing 10, which directs them onto endless conveyors 40 arranged one on each side of the deflector 39. The nuts then pass between the conveyors 40 and endless conveyors 41 located directly thereover. The nuts after passage between conveyors 40 and 41 may be gathered in any suitable manner. However, I preferably provide an inclined trough 42 which has a divider 43 therein to divert the nuts into bags or receptacles fastened or positioned to receive them at outlets 44 of the trough.

Particular attention is called to the fact that the conveyor 38 travels faster than the conveyor 37 and that the conveyor 41 travels faster than the conveyor 40. The speed of the conveyors 38 and 41 may be the same although one may operate faster than the other if desired. Due to the differential in speed of the different belts, the nuts with husks thereon, as they pass between the belts, will be contacted by the belts and the husks removed. Hence, the nuts falling into the trough 42 will be devoid of their husks. The husks however together with any foreign matter which is drawn into the machine as the nuts are collected and which passes with the nuts between the belts, will be blown out of the casing through a sack 45 in communication with the atmosphere above the chute 42. The action is effected through operation of a blower 46 mounted in a casing 47 and having a duct 48 discharging into the casing 10 over the trough 42.

All of the belts 37, 38, 40 and 41 and the blower 46, are driven from the aforesaid prime mover 30. To this end, a bevel gear 49 is keyed to shaft 27 and is enmeshed with a bevel gear 50 keyed to a short shaft 51 journaled in a side wall of the casing 10.

Exteriorly of casing 10, a pulley 52 is keyed to shaft 51 and a belt 53 is trained thereover and over a pulley 54 keyed to the shaft 55 of blower or fan 46 in order to drive the latter.

Endless belt or conveyor 37 at opposite ends is trained over pulleys or enlargements of shafts 56 and 57. Likewise, at opposite ends, the conveyor 38 is trained over pulleys or enlargements of shafts 58 and 59 at opposite ends; conveyor 40 is trained over enlargements or pulleys of shafts 60 and 61 at opposite ends, and conveyor 41 is trained over enlargements or pulleys on shafts 62 and 63 at opposite ends.

All of the shafts 56 to 63 are horizontal and journaled in a side wall of the casing 10 and also in adjacent vertical walls of boxes 64 and 65 within which the pairs of belts 37 and 38, and 40 and 41 are located, respectively. On the exterior of the casing 10, a belt and pulley drive is provided at 66 between the shaft 51 and shaft 63, a belt and pulley drive is provided between the shafts 62 and 60 at 67, a belt and pulley drive is provided between the shafts 62 and 58 at 68 and a belt and pulley drive is provided between the shafts 59 and 57 at 69.

From the foregoing, it will be clear that the nuts are collected, picked or harvested by vacuum or suction created through the nozzle 11 due to the action of the fan 18, the nuts being received in the chute 17 and passing into box 64 and thence between the conveyors 37 and 38, thence onto the deflector 39 and into the boxes 65 and between the conveyors 40 and 41 therein. The nuts have their husks removed due to the differential speeds of operation of the various belts and such husks are blown from the machine through the action of fan 46 through sack 45, the nuts falling into the trough 42 and being collected in bags registering with the outlets 44, or otherwise.

Various changes may be resorted to provided they fall within the spirit and scope of the invention.

I claim as my invention:

An apparatus of the class described comprising a casing, a trough therein having foraminous wall means and open at the bottom, a closure at the top of the casing constituting an air release means for the trough, a collecting conduit communicating with the trough, through said bottom, means within the casing to create a suction through the conduit, and means functioning dually to convey gathered nuts from the trough and to remove the husks therefrom, comprising upper and lower endless husking elements between which the nuts pass, said elements being movable at different speeds, the lower element extending beyond the upper element and constituting a bottom for said trough.

BENJAMIN F. BROWN.